United States Patent [19]

Rutenbeck

[11] Patent Number: 4,992,909
[45] Date of Patent: Feb. 12, 1991

[54] TELECOMMUNICATIONS INSTALLATION BOX

[75] Inventor: Harald Rutenbeck, Schalksmühle, Fed. Rep. of Germany

[73] Assignee: Wilhelm Rutenbeck GmbH & Co., Schalksmühle, Fed. Rep. of Germany

[21] Appl. No.: 356,991

[22] Filed: May 24, 1989

[30] Foreign Application Priority Data

May 26, 1988 [DE] Fed. Rep. of Germany ....... 3817869

[51] Int. Cl.[5] .............................................. H05K 1/14
[52] U.S. Cl. .................................. 361/413; 361/407; 439/65
[58] Field of Search ....................... 439/59, 62, 65, 69, 439/74, 76, 61; 361/393, 394, 395, 399, 412, 413, 400, 405, 407, 415, 426

[56] References Cited

U.S. PATENT DOCUMENTS

| 4,609,829 | 9/1986 | Milby | 361/407 |
| 4,685,032 | 8/1987 | Blomstedt | 361/407 |
| 4,896,248 | 1/1990 | Zell | 361/413 |
| 4,905,123 | 2/1990 | Windle | 361/407 |

FOREIGN PATENT DOCUMENTS 1615868 2/1974 Fed. Rep. of Germany .

Primary Examiner—Gerald P. Tolin
Attorney, Agent, or Firm—Herbert Dubno; Andrew M. Wilford

[57] ABSTRACT

A telecommunications installation has a plurality of stationary and similar base plates including one main plate and a plurality of secondary plates mounted stationarily immediately adjacent one another and each formed with mounting holes. Respective different circuits each mounted on a respective one of the plates are each provided with an array of stiff connectors. A terminal strip mounted only on the main plate and provided with an array of stiff connectors matable with the connectors of the circuit of the main plate is itself provided with a bus extending from the strip of the main plate, having a plurality of conductors connected to the connectors of the terminal strip, extending along the secondary plates, and provided at each of the secondary plates with an array of stiff connectors matable with the connectors of the respective circuit. Respective caps are releasably secured to each of the plates over each of the respective circuits.

7 Claims, 2 Drawing Sheets

TELECOMMUNICATIONS INSTALLATION BOX

BACKGROUND OF THE INVENTION

1. Field of the invention

The invention concerns a telecommunications installation or services box for fixed mounting, consisting of an essentially plate-form base part having a cable entry, a connecting strip or terminal block, mounting apertures, a function insert, for example a printed circuit board having electrical and/or electronic components, a plug-in connecting receptacle or socket, a changeover switch, an electrical locking device, a call tone device, an alarm device and the like, and a cover mountable on the base part, optionally having a throughgoing opening for connecting parts such as plugs or sockets.

2. Description of the prior art

A telecommunications installation box of this kind is known, for example, from German Patent Specification No. 1,615,868.

In these known installation boxes, side-by-side placement or a one above another arrangement are indeed possible, so that different functional inserts may be disposed on the base part. It is however necessary in this known construction for the installer to connect these installation boxes and the terminal strips to the corresponding wires of the connecting cable, as otherwise the function inserts themselves will be mis-connected or mis-wired. Moreover, in the side-by-side or superposed disposition of such installation boxes, internal wiring from one box to another is necessary, so that the corresponding function inserts may be connected either in parallel to one another or in series. In practice, this has resulted in these connection possibilities causing wiring mistakes, since, during installation, connections are frequently exchanged, and thus the desired function is not then achieved. In addition, the installation outlay is very time-consuming and therefore cost-intensive. Furthermore, it is only possible for highly skilled people to modify existing arrays of function inserts arranged one behind the other with considerable expenditure of time, for example so that a locking device may be placed in front of the actual telephone connection.

In particular, in the installation of telecommunications networks for buildings, the existing wiring outlay is extraordinarily high, since not only telephone handsets are immediately installed, but also, besides, other additional devices, having either cable connection boxes or plug connection boxes, switching devices, locking devices for telephones, dial tone devices and the like are installed.

BRIEF SUMMARY OF THE INVENTION

Proceeding from this state of the art, it is an object of the invention to provide a generically suitable installation box, which is substantially simplified in respect of its wiring outlay and assures a great number of simple conversion possibilities in respect of its application.

In order to meet this objective, it is proposed that several modularly formed base parts connected into a single unit are arranged beside and/or above one another, one of which has the connecting strip with cable entry and a function insert, and another or others of which have only a function insert, the connecting strip having rigid connecting parts to which the corresponding rigid connectors of the function insert are connectible, the connecting strip being further connected to a rigid conductor connector carried through the further base part or parts, which has in each case, rigid connecting parts in each base part for the coupling of further rigid connectors of further function inserts, and in addition, a matching cover is provided for each function insert.

By the concept "modular formation or construction" is to be understood that all parts conform to a specific structural model, so that the parts may be combined with one another as desired. In addition, the structural model should correspond to the greatest possible extent to the hitherto customary installation features of hitherto used installation boxes. Thus, for example, the base surface height of the individual components should correspond to the height of a normal concealed installation cover part (usually 80 mm). The base surface width should likewise match the usual dimension, which is for example 71 mm. The spacing of the base mounting holes should correspond to the screw spacing of normal concealed wall boxes (60 mm). By virtue of this modular form of construction, all components may be mounted by means of normal concealed wall boxes. They represent therefore universal structural components for surface and concealed installation networks.

Since according to the invention, only one base portion has a connecting strip for connection to the wires of the connecting cable, the other base portions having only connectible connecting parts, an installer only has to connect the connecting strip to the connecting cable in due order and at the right location, following which the connection of function components with the base parts of the installation boxes can be carried out very easily and without mental effort. A false connection is therefore almost completely to be excluded.

By the concept "rigid or stiff" in regard to the connecting portions and the connector, it is to be noted that in this regard fixedly installed connecting strips or the like are in question, but not flexible cables with connecting plugs, since these may once again be falsely connected. The connecting strip is, according to the invention, connected to a rigid conductor connector, which represents more or less a "bus", and has on the one hand connecting elements for connecting to the corresponding connecting elements of the connecting strip portion and on the other hand connecting elements for the connection of functional inserts. These inserts are disposed in the further base parts, which are not equipped with a connecting strip. In this way also, a functional insert is connectingly insertable on the base part on which the connecting strip is disposed, the connecting strip having corresponding connecting elements for the connection of a functional insert. The installation results in the connecting strip being first of all connected to the wires of the connecting cable and the connecting strip being then connected to the rigid conductor connector carried through the further base parts, insofar as it is not already previously formed in one piece or integrally with this, as subsequently described. After selection of the corresponding function parts, functional inserts according to choice may then in each case be connected to a base part in such a way that the plug or connecting members of the functional inserts are mounted on the corresponding plug or connecting elements of the connecting strip and/or of the conductor connector carried through the further base parts. The disposition and sequence is left to the installer's discretion. For each functional insert, a cover suited to this functional insert usually belongs, which may for example be closed or may have an opening for the insertion of a plug or also for the connection of additional supplies to the network or the like.

Insofaras the location installation of a functional insert may be changed, this is possible with great facility, the associated covers then usually also likewise must be moved.

It is clearly also possible to provide, according to the invention, a single socket part having a connecting strip, instead of the multiple unit (base part with connecting strip having one or more further base parts additionally added), in order to also facilitate in this regard the connection of a corresponding functional insert and to improve the electrical wiring in regard to its correct locational disposition.

In regard to the electrically conducting components such as the connecting strip, plug connection parts, connectors, the functional insert, and the conductor connector, there is under the concept "connection" in each case to be understood not only a mechanical connection but also an electrical connection.

In a further embodiment, the invention proposes that the connecting strip be pluggingly connectible with the conductor connector.

A preferred variant is seen in forming the conductor connector as a printed circuit board, to which the connecting strip is fixedly connected.

A further variant consists in the conductor connector being formed as a strip form part, which is insertable in mounts of base parts disposed parallel to one another and has contacts insertable in the connecting strip, as well as contacts which are pluggingly connectible with functional inserts of further base parts.

It is preferably provided that the base parts are formed in one piece as multiple-combination parts.

A possible embodiment consists in the conductor connector having connecting parts connected electrically parallel to one another for connection to the connecting strip and the functional parts.

In combination with or as an alternative to the foregoing, it may be provided that the conductor connector has connecting parts connected electrically serially with respect to one another for connection to the connecting strip and the functional parts.

Furthermore, it is provided that the conductor connector includes electrical and/or electronic components, in particular components such as for over-voltage protection, for example, varistors, spark gaps and the like.

A particular detail consists in the connecting strip and the conductor connector being formed with multiple poles, in particular with six poles.

BRIEF DESCRIPTION OF THE DRAWINGS

Embodiments of the invention are shown in the drawings and are described in more detail in the following section.

DETAILED DESCRIPTION OF THE DRAWINGS

Figure 1:
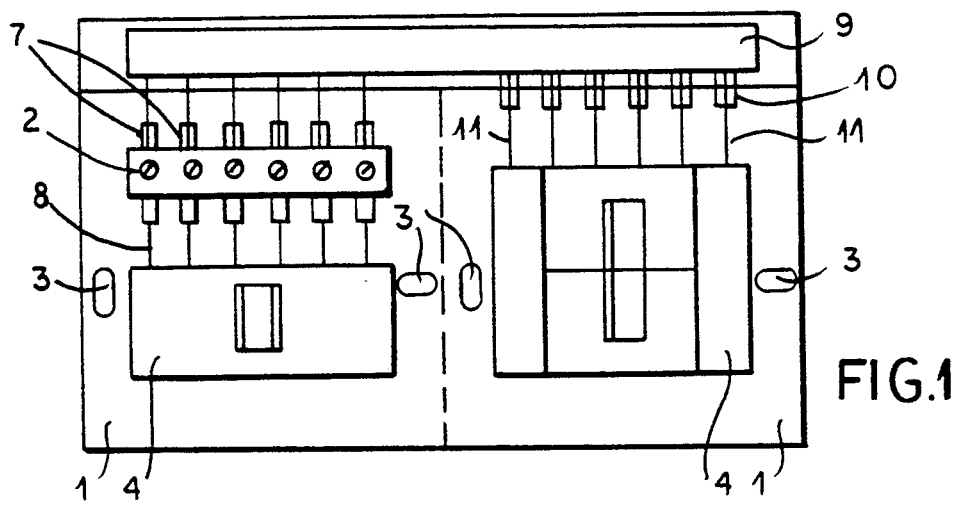
FIG. 1 shows in elevation a dual unit of an installation or services box without a cover.

In the drawings, telecommunications installation or services boxes for fixed mounting are shown, which essentially consist of a plate form base part 1 of rectangular basic shape having an opening for the introduction of a cable, and a connecting terminal block or connecting strip 2, as well as having mounting holes or openings 3, a function insert 4 and a cap or cover 5 lockingly mountable on the base part, the cover optionally having a through opening 6 for a connecting portion. According to the invention, several modularly formed base parts 1 are connected together into a single unit or are formed in one piece. In the embodiments, these base parts 1 are arranged beside one another. Only a main one of these base parts 1, in the Figures of the drawings in each case that on the left, has the connecting strip 2 with cable entry and a function insert 4. Each secondary base part 1 is provided with only a function insert 4. The terminal strip 2 has rigid connector portions 7, for example in the form of sockets, into which corresponding rigid connectors 8, for example in the form of plugs, are insertable. The direction of insertion is in the embodiment oriented upwardly from below in the plane of the drawing. The terminal strip 2 is also connected to a rigid bus or conductor connector 9 carried through the further base parts 1. The conductor connector 9 has in each case in each base part 1 rigid connector parts 10, for example in the form of socket connectors. In these connector portions 10, corresponding rigid connectors 11 of further function inserts 4 are insertable, which, for example, may be in the form of plug pins. A corresponding cover 5 belongs to each function insert 4.

Figure 2:
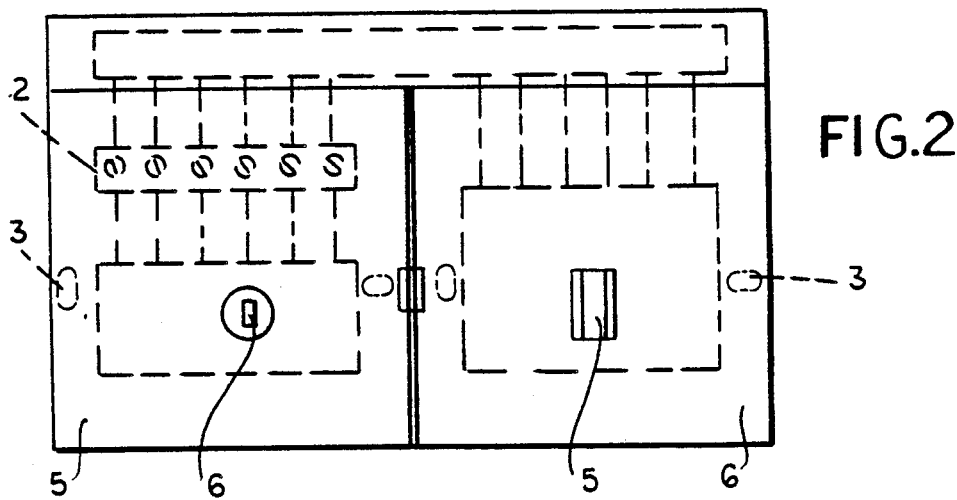
FIG. 2 shows the same with a cover disposed on it.

According to the embodiment of FIGS. 1 and 2, the connecting strip 2 is also connected to the conductor connector 9, for which both parts may again have connecting sockets and plugs. Also, in this embodiment, the conductor connector 9 may take the form of a printed circuit board.

Figure 3:
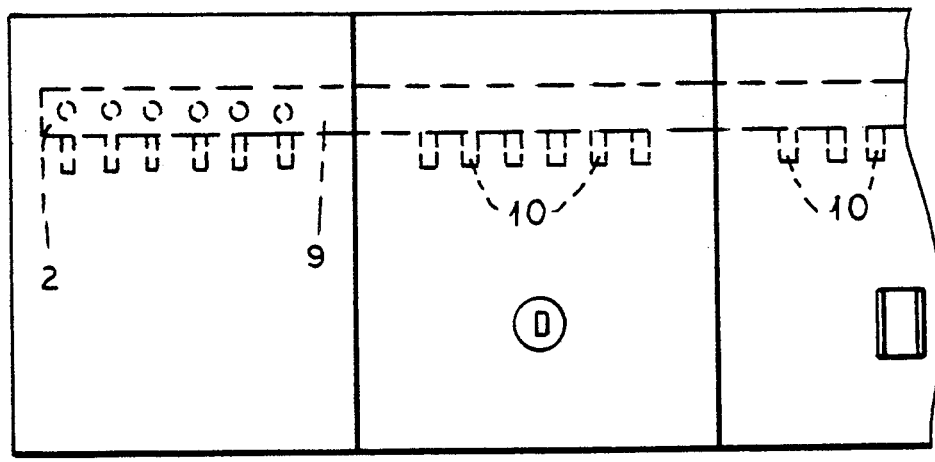
FIG. 3 shows a multiple arrangement seen similarly to FIG. 2.
Figure 4:
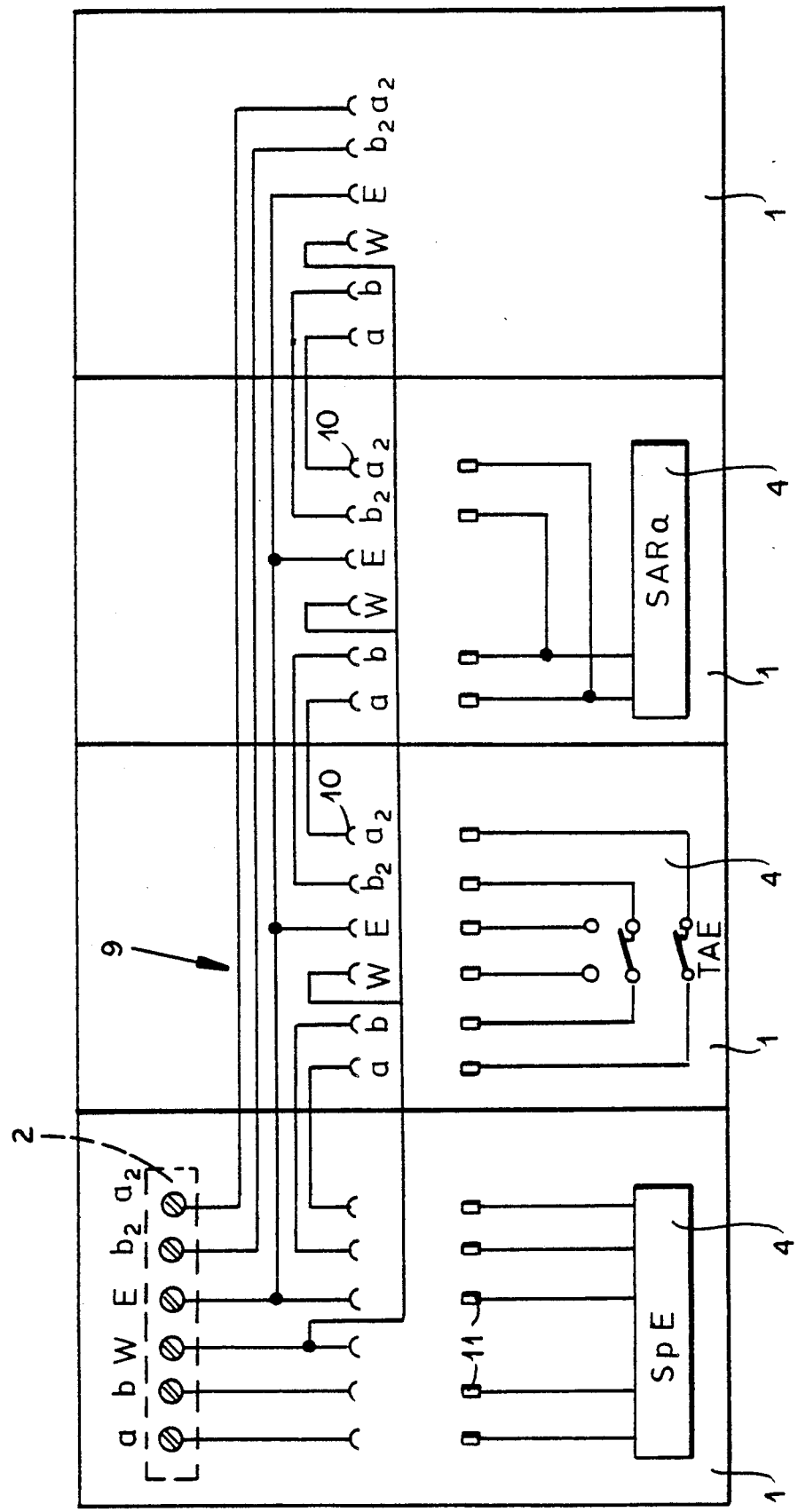
FIG. 4 shows a fourfold arrangement, seen in the same view as FIG. 1.

In the embodiment according to FIGS. 3 and 4, the conductor connector 9 is formed as a printed circuit board, on which printed circuit board, the connecting strip 2 is disposed in fixed connection.

In the embodiment according to FIGS. 1 and 2, the conductor connector 9 is formed as a strip-type connecting part, which is insertable in mounts of base parts 1 arranged parallel to one another and has both contacts which are insertable in the connecting strip 2 and also contacts which are pluggingly connectible with function inserts 4 of further base parts 1. The base parts 1 may for this purpose either be formed as an integral or one-piece unit or alternatively as single components, which are disposed beside one another and are connected to one another in a suitable manner.

According to the desired electrical function in each case, the conductor 9 may have connector portions connected either electrically parallel to one another or in series, for connection to the terminal strip 2 and the function part 4.

In the embodiments, the connecting strip 2 is formed with six poles for the connection of the connecting conductors a, b, of the signal line W, of the earth E, as well as of the continuation connection conductors a2, b2. This six-poled arrangement is sufficient for the majority of all use situations. It is obviously also possible to provide an arrangement having more poles or less poles.

In the embodiment according to FIG. 4, the electrical through connection by means of the conductor connector 9 to the function units 4 is shown. In FIG. 4 of the drawings, on the lefthand side, a locking device SpE is shown as a function insert, in the base part 1 located next to it to the right, a telecommunications wall socket TAE is shown, and in the base portion 1 located next to it to the right, a heavy current switching relay SAR is shown, which is for example necessary for switching a call signal. By means of the conductor connector 9, the six connecting poles are put in the right place for use in each base part 1, while the function inserts have their corresponding connecting contacts correctly placed for appropriate or correct connection to the connecting parts of the conductor connector. During installation, the installer is given complete freedom in regard to the arrangement of the individual function inserts, so that incorrect wiring is to be avoided. In addition, subsequent change or exchange of function inserts is easily possible and may be carried out in an electrically correct manner.

The invention is not limited to the embodiments, but may be varied in a multiplicity of ways within the scope of the disclosure.

All new features disclosed in the description and/or in the drawings, either individually or in combination, are regarded as pertaining to the invention.

I claim:

1. A telecommunications installation comprising:
   a plurality of stationary and physically similar base plates including one main plate and a plurality of secondary plates mounted stationarily immediately adjacent one another and each formed with mounting holes;
   respective printed circuit boards each carrying different electrical components and each mounted on a respective one of the plates and each provided with an array of stiff connectors;
   a terminal strip mounted on the main plate and provided with an array of stiff connectors mating with the connectors of the main plate;
   a bus extending from the strip of the main plate and having a plurality of conductors connected to the connectors of the terminal strip, the bus mounted to and extending along the secondary plates and provided at each of the secondary plates with an array of stiff connectors mating with the connectors of the respective secondary plates and
   respective caps releasably secured to each of the plates over each of the respective printed circuit boards.

2. The installation defined in claim 1 wherein the connectors plug into one another.

3. The installation defined in claim 1 wherein the bus is a printed circuit fixed to the terminal strip.

4. The installation defined in claim 1 wherein all of the plates are substantially identical and are each of one piece.

5. The installation defined in claim 1 wherein some of the connectors of the bus are connected in parallel.

6. The installation defined in claim 1 wherein some of the connectors of the bus are connected in series.

7. The installation defined in claim 1 wherein the bus includes at least one active circuit element.

* * * * *